United States Patent [19]

Nishida et al.

[11] Patent Number: 5,546,522
[45] Date of Patent: Aug. 13, 1996

[54] OPTIMAL MENU INQUIRY SYSTEM AND SYSTEM FOR EDITING STRUCTURE DATA BY HIERARCHICAL MENU INQUIRY PROCESSING

[75] Inventors: Tetsuro Nishida; Takashi Shinoda, both of Tokyo, Japan

[73] Assignee: NEC Corporation, Tokyo, Japan

[21] Appl. No.: 197,194

[22] Filed: Feb. 16, 1994

[30]  Foreign Application Priority Data

Feb. 18, 1993 [JP] Japan ................................. 5-051326
Dec. 3, 1993 [JP] Japan ................................. 5-339029

[51] Int. Cl.$^6$ ................................................ G06F 15/00
[52] U.S. Cl. ................................................ 395/156
[58] Field of Search ..................... 395/155–161; 345/117–120, 146, 902

[56]  References Cited

U.S. PATENT DOCUMENTS

| | | | |
|---|---|---|---|
| 4,712,191 | 12/1987 | Penna | 395/156 |
| 4,772,882 | 9/1988 | Mical | 395/156 |
| 4,823,283 | 4/1989 | Diehm et al. | 395/156 |
| 4,974,174 | 11/1990 | Kleinman | 395/156 |
| 5,208,910 | 5/1993 | Higgins et al. | 375/156 |
| 5,261,042 | 11/1993 | Brandt | 395/156 |
| 5,287,514 | 2/1994 | Gram | 395/156 |
| 5,367,619 | 11/1994 | Diapaolo et al. | 395/156 |

OTHER PUBLICATIONS

W. Kim et al., "DON: User Interface Presentation Design Assistant", *Third Annual Symposium on User Interface Software and Technology, Proceedings of the ACM Siggraph Symposium* pp. 10–20 (1990).

G. Fisanotti, "GENMEN–a DCL Menu Generator", *Vax Professional* 9(2): 44–46 (1987).

D. Hudson et al, "A Microcomputer–Based Menu–Driven System", *Proceedings of the ISMM International Symposium Software and Hardware Applications of Microcomputers* pp. 11–15 (1987).

*Primary Examiner*—Mark R. Powell
*Assistant Examiner*—John E. Breene
*Attorney, Agent, or Firm*—Foley & Lardner

[57]  ABSTRACT

An optimal menu inquiry system includes a skeleton data generating means, a tree structure data constructing means, a menu display means, a control means, and a menu candidate determining means. The skeleton data generating means generates inquiries, from a rule description describing the context of the inquiries, as skeleton data by sequentially linking the inquiries, from the first inquiry to the subsequent inquiries, in the form of a tree structure. The tree structure data constructing means constructs and updates tree structure data by sequentially retracing the skeleton data from first data. The menu display means displays menu items corresponding to constructed/updated tree structure data. The control means controls the tree structure data constructing means to update the tree structure data when one of the menu items displayed by the menu display means is selected. The menu candidate determining means evaluates an evaluable expression in the skeleton data by referring to the updated structure data, and determines menu item candidates to be displayed by the menu display means.

5 Claims, 10 Drawing Sheets

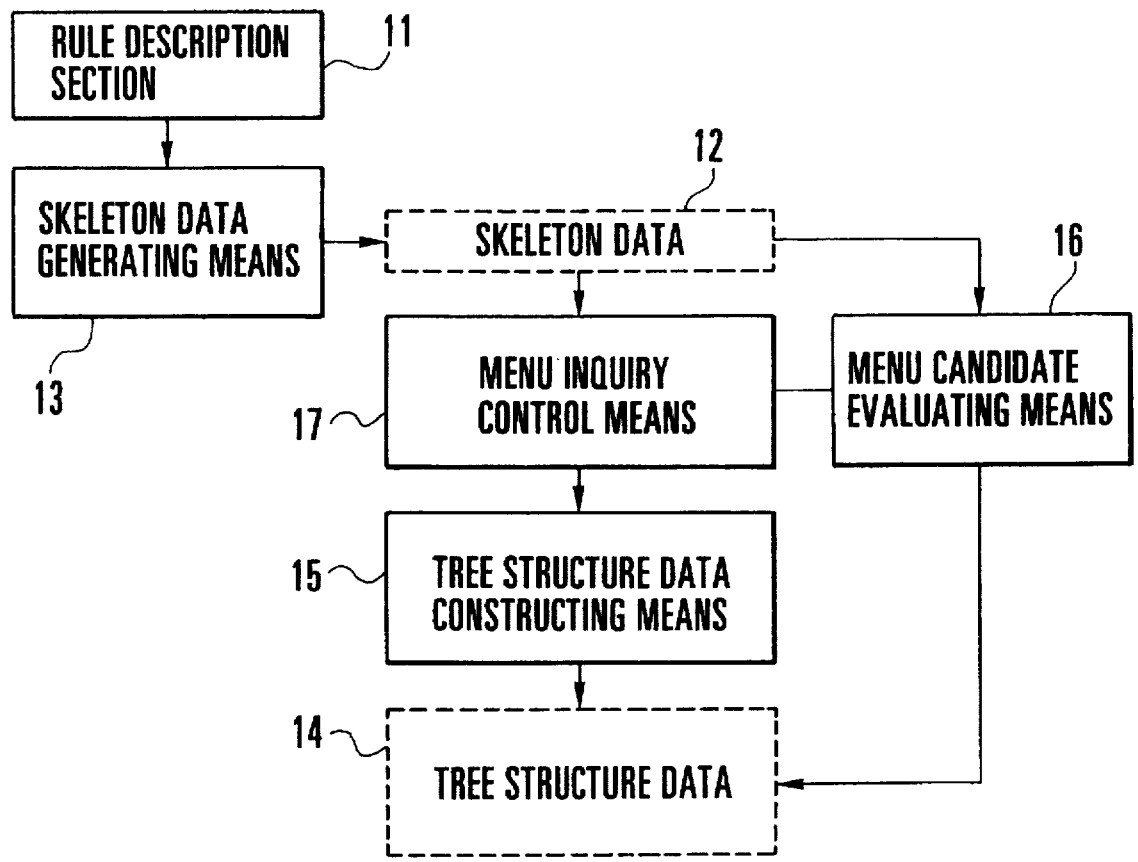
F I G. 1
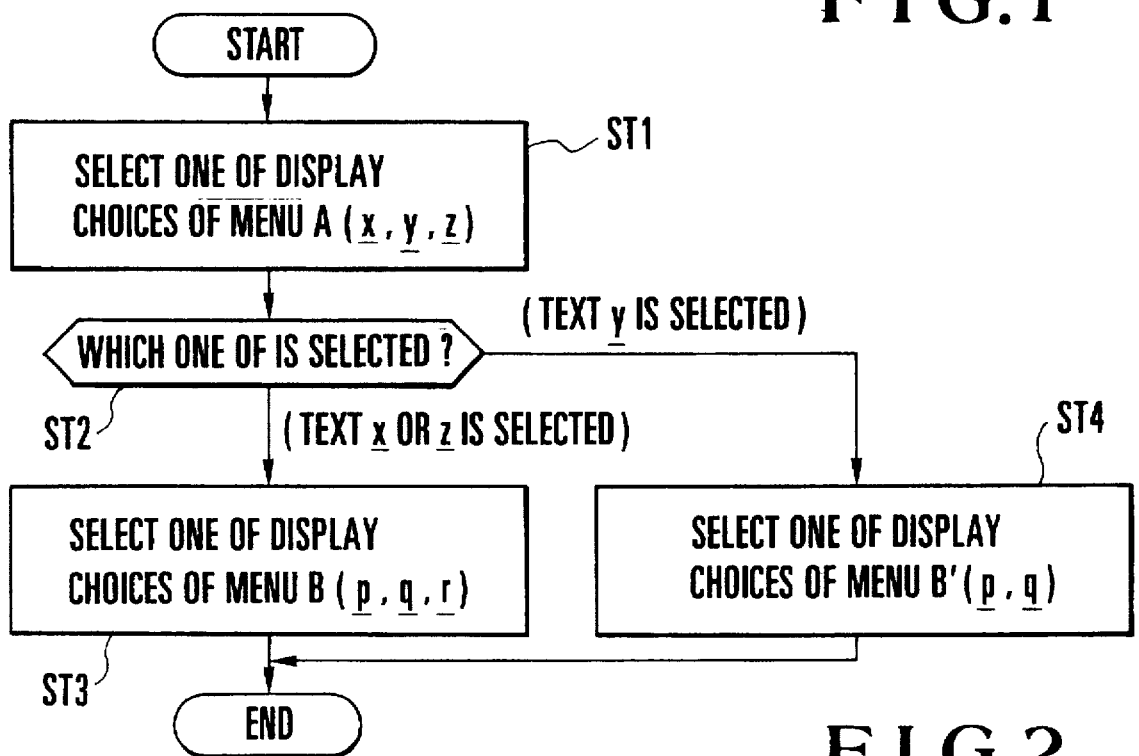
F I G. 2

```
%inquiry=struct{%menu-A %menu-B}

%menu-A=oneOf{%item-x %item-y %item-z}
    menuText  {xyz}

%menu-B=oneOf{%item-p %item-q %item-r}
    menuText  {pqr} where{
    if(%$.up.[0].down.class==%item-x)
        candidate  {pqr}
    else if(%$.up.[0].down.class==%item-z)
        candidate  {pqr}
    else
        candidate  {pq}
}

%item-x=empty

%item-y=empty

%item-z=empty

%item-p=empty

%item-q=empty

%item-r=empty
```

FIG. 3

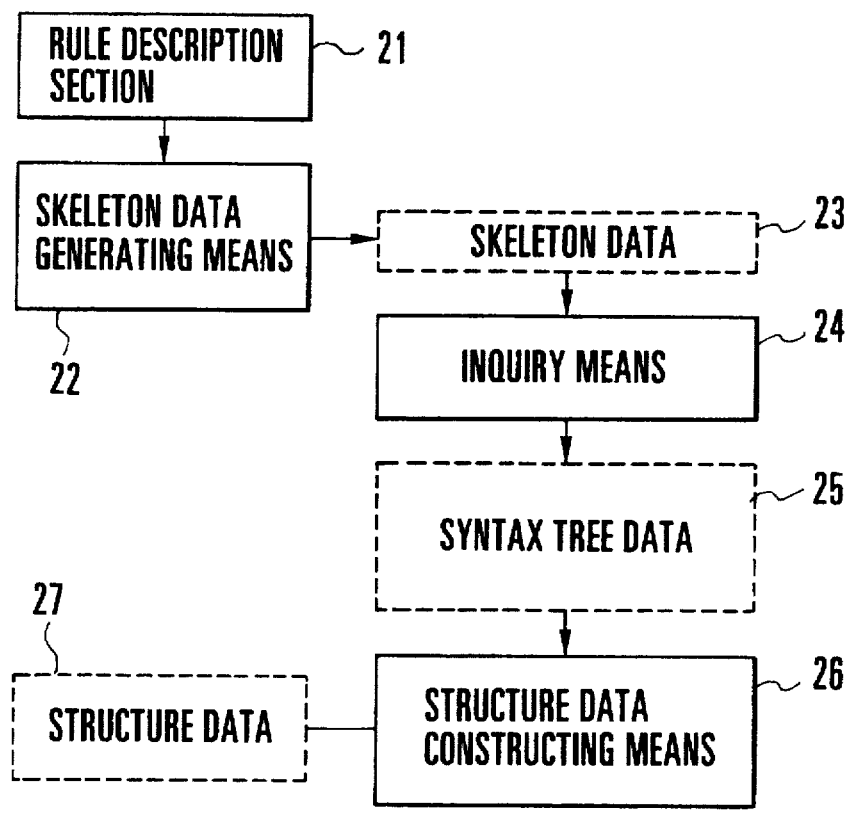
F I G. 5
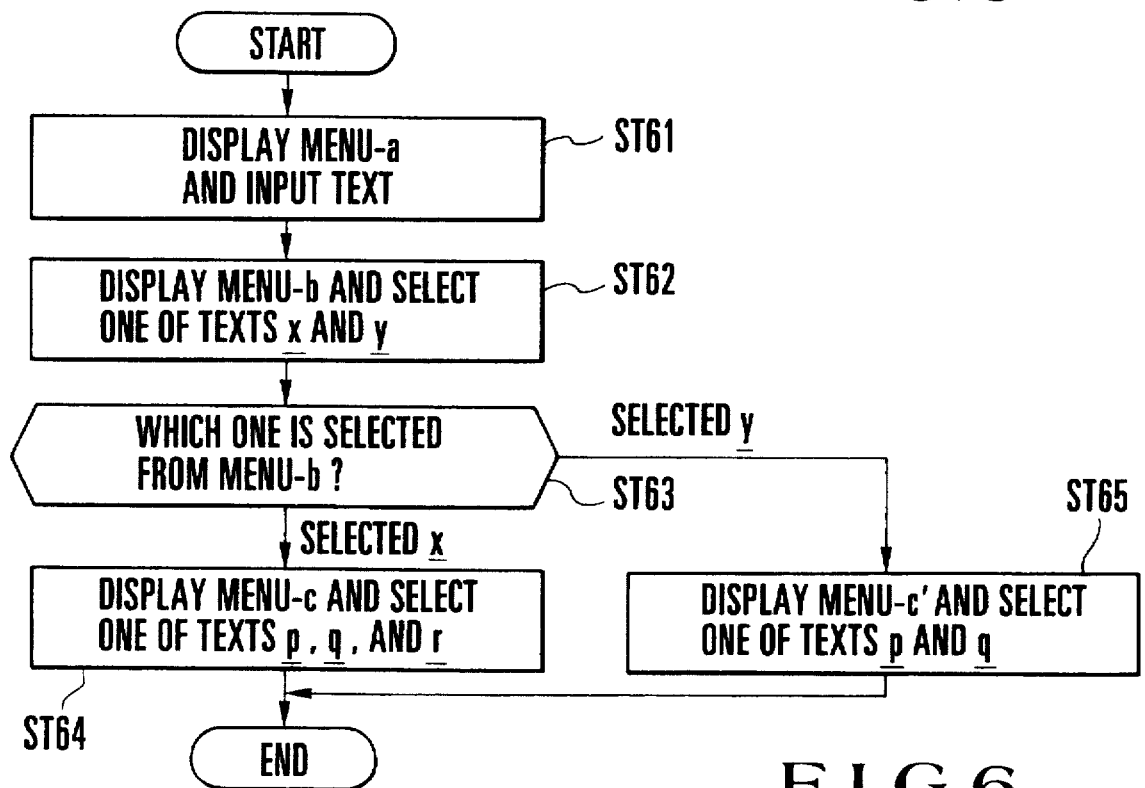
F I G. 6

```
 1  /***** example of menu description *****/
 2
 3  /* struct type skeleton description */
 4  %inquiry = struct( %menu-a %menu-b %menu-c )
 5      format( "answer(%t,%t,%t)" %[0], %[1], %[2] )
 6
 7  /* field type skeleton description */
 8  %menu-a = field
 9      message     ( " input text " )
10      maxChars    16
11
12  /* one of type skeleton description */
13  %menu-b = oneOf( %item-x %item-y )
14      message     ( " select one of items" )
15      menuText "\
16  xxx;\
17  yyy"
18
19  /* one of type skeleton description */
20  %menu-c = oneOf( %item-p %item-q %item-r )
21      message     ( " select one of items" )
22      menuText "\
23  ppp;\
24  qqq;\
25  rrr"
26      where( switch(%$.up[1].down.class){ /*  perform branch operation upon     */
27                                          /*  selection through %menu-b        */
28          case %item-x:                   /*  %item-p, %item-q, and            */
29              candidate(ppp,qqq,rrr);     /*  %item-r are set as candidates when */
30              break;                      /*  %item-x is selected              */
31          case %item-y:                   /*  %item-p and                      */
32              candidate(ppp,qqq);         /*  %item-q are set as candidates when */
33              break;                      /*  %item-y is selected              */
34          }
35      )
36
37  /* quote type skeleton description */
38  %item-x = "xxx"
39      format      ( "XXX" )
40  %item-y = "yyy"
41      format      ( "YYY" )
42
43  /* quote type skeleton description */
44  %item-p = "ppp"
45      format      ( "PPP" )
46  %item-q = "qqq"
47      format      ( "QQQ" )
48  %item-r = "rrr"
49      format      ( "RRR" )
```

FIG. 7

OPTIMAL MENU INQUIRY SYSTEM AND SYSTEM FOR EDITING STRUCTURE DATA BY HIERARCHICAL MENU INQUIRY PROCESSING

BACKGROUND OF THE INVENTION

The present invention relates to an optimal menu inquiry system used to display a plurality of inquiries having a hierarchical structure on a graphic in a computer system having an interactive means for a dialogue between the system and a user, and a system for editing structure data by hierarchical menu inquiry processing while displaying a plurality of inquiries having a hierarchical structure on a graphic screen.

As the first conventional technique associated with menu inquiry processing of this type performed on a computer system, a technique is available, in which when an item is to be selected in response to one inquiry, items on a menu are fixed in a program or a file description. In this case, selection items considered as unnecessary in terms of the context of inquiries are included in menu inquiry processing.

As the second conventional technique associated with menu inquiry processing, a technique is available, in which menu outputs, interpretation of results, and menu determination programs are specially prepared for each inquiry to execute menu inquiry processing in accordance with each inquiry.

In addition, as the first technique of editing structure data, a technique is available, which includes a special inquiry means corresponding to each of inquiries having a hierarchical structure, and an editing means for editing structure data upon determining each inquiry result, thereby constructing structure data.

Furthermore, as the second technique of editing structure data, a syntax-directed editor used to input/edit programs is available. In general, a program is not simply a text but can be regarded as structure data formed by hierarchically stacking texts. This syntax-directed editor is formed, from an attribute grammar describing the meaning and rule of a program language, as a special syntax-directed editor for the program language. The syntax-directed editor serves to construct a syntax tree expressing the structure of the program, thus editing the program as one type of structure data.

In the first conventional technique associated with menu inquiry processing, since selection items considered as unnecessary in terms of the context of inquiries are also displayed, the operability is poor in actually operating the computer system.

In the second technique associated with menu inquiry processing and the first technique of editing structure data, since special processing corresponding to each inquiry is required, the sizes of programs for realizing the inquiry means and the editing means are increased in proportion to the number of inquiries. In addition, when inquires are to be added or constructed data is to be changed after a system is constructed, a corresponding program needs to be added or a prestored program needs to be changed, resulting in poor maintainability.

The second technique of editing structure data is a language-oriented scheme. That is, both the attribute grammar and a syntax tree constructed as the result of inquiry processing conform to the meaning and rule of the language. Therefore, the technique cannot be used for an inquiry system for constructing versatile structure data.

SUMMARY OF THE INVENTION

It is, therefore, an object of the present invention to provide an inquiry system for realizing menu inquiry processing with excellent operability and excellent maintainability by using a small-sized program, and constructing versatile structure data.

In order to achieve the above object, according to the present invention, there is provided an optimal menu inquiry system comprising skeleton data generating means for generating inquiries, from a rule description describing a context of the inquiries, as skeleton data by sequentially linking the inquiries, from the first inquiry to the subsequent inquiries, in the form of a tree structure, there is also tree structure data constructing means for constructing and updating tree structure data by sequentially retracing the skeleton data from first data, the skeleton data being sequentially generated by the skeleton data generating means in correspondence with each of the inquires from the first inquiry to the subsequent inquires, Menu display means is for displaying menu items corresponding to constructed/updated tree structure data, control means is for controlling the tree structure data constructing means to update the tree structure data when one of the menu items displayed by the menu display means is selected, and menu candidate determining means is for evaluating an evaluable expression in the skeleton data by referring to the updated structure data, and determining a menu item candidate to be displayed by the menu display means.

BRIEF DESCRIPTION OF THE DRAWINGS

FIG. 1 is a block diagram showing the first system to which an optimal inquiry system of the present invention is applied;

FIG. 2 is a flow chart showing an example of the context of inquiries to explain the effects of the first system;

FIG. 3 is a view showing a state of a rule description in the first system;

FIG. 5 is a block diagram showing the second system to which a system for editing hierarchical data by hierarchical menu inquiry processing according to the present invention is applied;

FIG. 6 is a flow chart showing an example of inquiry processing to explain the effects of the second system;

FIG. 7 is a view showing a state of a rule description for realizing the example of inquiry processing which is used to explain the effects of the second system;

DESCRIPTION OF THE PREFERRED EMBODIMENTS

Figure 4:
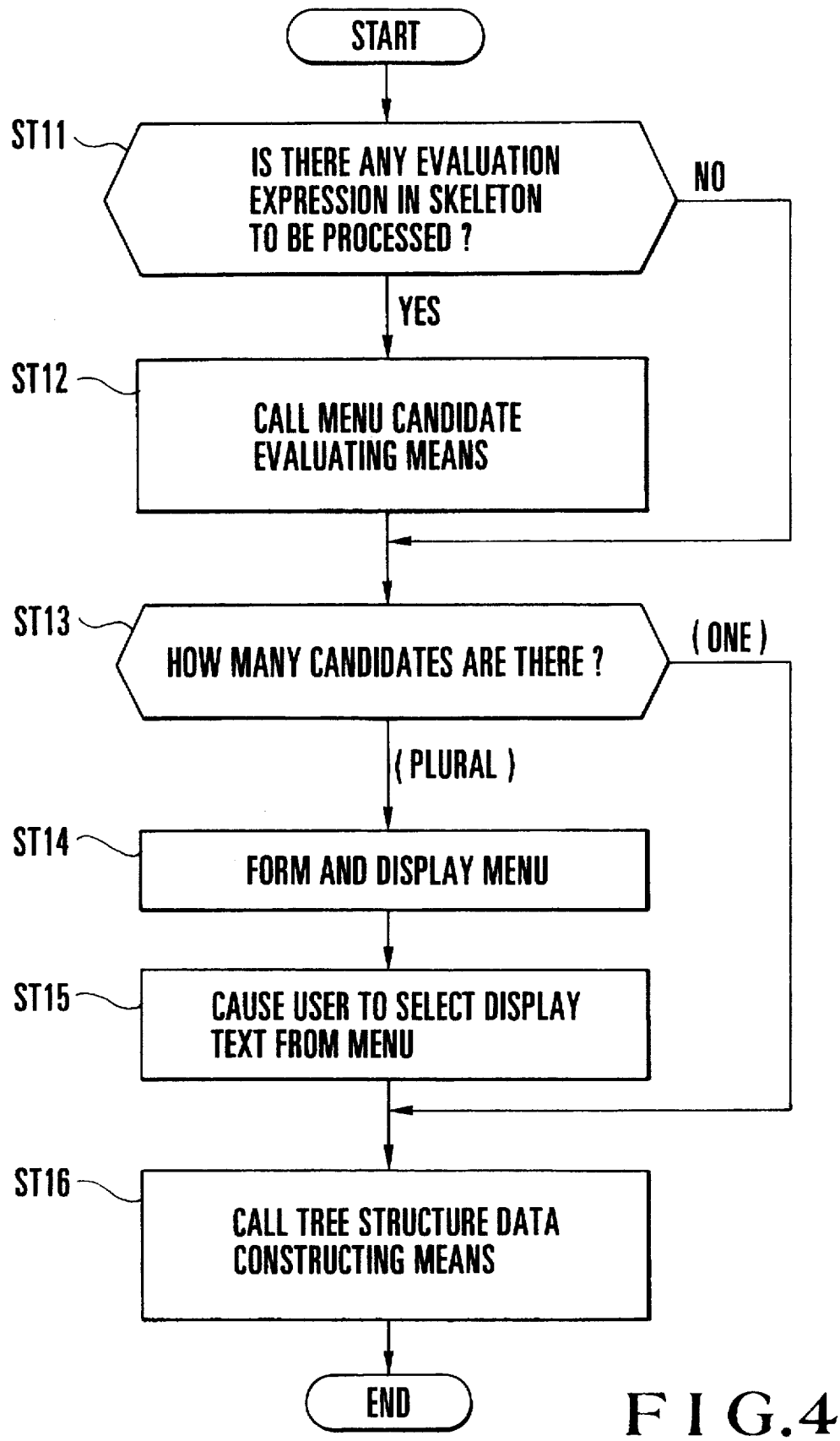
FIG. 4 is a flow chart showing the operation of a menu inquiry control means constituting the first system.

The present invention will be described below with reference to the accompanying drawings.

FIG. 1 shows a computer system to which an optimal menu inquiry system of the present invention is applied.

Referring to FIG. 1, this system comprises a rule description section 11, a skeleton data generating means 13, a tree structure data constructing means 15, a menu candidate evaluating means 16, and a menu inquiry control means 17. The context of inquiries is described in the rule description section 11. The skeleton data generating means 13 generates data 12 (referred to herein as "skeleton data") by linking the respective inquiries from the rule description section 11 in the form of a tree structure. The tree structure data constructing means 15 constructs tree structure data 14 from pieces of information on actually selected items. The menu candidate evaluating means 16 evaluates an evaluable expression (to be described later) on the skeleton data 12 by referring to the tree structure data 14 before a menu is displayed, thus determining candidates to be displayed on the menu. The menu inquiry control means 17 performs processing (calling the menu candidate evaluating means 16, displaying/forming a menu, and calling the tree structure data constructing means 15) corresponding to a skeleton data inquiry method.

FIG. 2 shows an example of the context of inquiries to explain the effects of the embodiment. In this case, two inquiries about menus A and B are continuously selected.

In step ST1, display texts x, y, and z are the display choices of the menu A and one is selected. If it is determined in step ST2 that the text x or z is selected, display texts p, q, and r are the display choices of the menu B and one is selected. If it is determined in step ST2 that the text y is selected, the texts p and q are the display choices of a menu B' and one selected.

That is, one of the display texts x, y, and z of the menu A is selected, and one of the display texts p, q, and r of the menu B is selected. In this case, if the text y is selected from the menu A, the text r cannot be selected from the menu B, and the menu B' is newly required. In such a case, according to the prior art, a special program for the menu B' is required.

In the present invention, such an inquiry context can be expressed by a small amount of rule description without using a special program for the menu B'.

FIG. 3 shows an example of the rule description corresponding to the flow chart showing the inquiry context in FIG. 2.

Referring to FIG. 3, "%xxx" indicates a skeleton identification name. Several types of skeleton identification names are provided in accordance with inquiry methods. In the description shown in FIG. 3, "struct", "oneOf", and "empty" are set as three types of skeleton identification names.

In this case, "skeleton =struct{skeleton_1 skeleton_2 . . . } indicates that the skeleton is constituted by child tree (or sub-tree) structure data skeleton_1, skeleton_2, . . . , and the child tree structure data are constructed in the order of skeleton_1, skeleton_2, . . . . Therefore, "%inquiry" means that "%menu-A" and "%menu-B" are inquired.

In addition,

"skeleton=oneOf{skeleton_1   skeleton_2   . . .
}menuText{display_item_1  display_item_2 . . .
}where{evaluable-_expression}"

indicates that the skeleton has one of child tree structure data skeleton_1, skeleton_2, . . . , and a menu having display items to be selected as candidates upon evaluation of the evaluable expression, as choices is displayed. If, for example, display item i is selected, skeleton i is set as child tree structure data. Note that if there is no "where" syntax, all the display items are selected as candidates.

The meanings of the respective symbols in the evaluable expression shown in FIG. 3 will be described next.

"if (logical expression) statement 1 else statement 2" indicates that if the logical expression is satisfied, statement 1 is executed, otherwise statement 2 is executed.

In this case, "expression 1==expression 2" in the logical expression indicates that the logical expression is true if the evaluation results of expressions 1 and 2 are equal to each other. "%$" indicates self-tree structure data. In this case, this symbol indicates the tree structure data of "%menu-B".

In addition, "expression.up" indicates that the evaluation result of the expression is tree structure data, and this symbol represents parent tree structure data thereof. In this case, the symbol represents tree structure data of "%inquiry". "Expression.[n]" indicates that the evaluation result of the expression is tree structure data of a "struct" type, and this symbol represents the nth child tree structure data thereof. In this case, the symbol represents tree structure data of "%menu-A". "Expression.down" indicates that the evaluation result of the expression is tree structure data of "oneOf" type, and this symbol represents child tree structure data thereof. In this case, the symbol represents child tree structure data of "%menu-A" constructed before the construction of "%menu-B". Therefore, the symbol indicates one of tree structure data of "%item-x", "%item-y", and "%item-z".

"Expression.class" indicates that the evaluation result of the expression is tree structure data, and this symbol represents the skeleton identification name thereof. In this case, therefore, "%$.up.[0].down.class==%item-x" represents a logical expression indicating whether the skeleton identification of child tree structure data of "%menu-A" constructed before the construction of "%menu-B" is "%item-x". That is, "%$.up.[0].down.class" performs evaluation from the left.

"Candidate {display_item_1 display_item_2 . . . }" is a statement having display_item_1, display_item_2, . . . as candidates. Therefore, the evaluable expression of "%menu-B" indicates that if the texts x and z are selected by "%menu-A", the texts p, q, and r are set as candidates; otherwise, the texts p and q are set as candidates.

Note that "skeleton=empty" indicates tree structure data having no contents. In this case, therefore, no inquiry is made.

Such a rule description in the rule description section 11 is converted into the skeleton data 12 by the skeleton data generating means 13. The skeleton data 12 is formed by linking a plurality of skeletons in accordance with a parent/child relationship, and each skeleton has information on a skeleton type, a skeleton identification, a child skeleton, a menu display text, an evaluable expression, and the like, which information is obtained from the rule description section 11. The skeleton data generating means 13 is called at the start of the system to generate the skeleton data 12 and develop it in memory (not shown).

The operation of the menu inquiry control means 17, which is to be performed when the texts y and p are respectively selected from the menus A and B in the flow chart of FIG. 2 showing an inquiry context, will be described next with reference to the flow chart of FIG. 4.

FIG. 4 shows processing to be performed when a skeleton type is "oneOf (single selection)".

More specifically, the menu inquiry control means 17 sets first skeleton ("inquiry" skeleton) on the skeleton data 12 as an object to be processed. Since the skeleton type is "struct", the menu inquiry control means 17 recognizes that inquiries about "menu-A" and "menu-B" skeletons as child skeletons are required. Note that "struct" itself has no inquiry.

The menu inquiry control means 17 calls the tree structure data constructing means 15 to cause it to construct the tree structure data 14. In this case, an "inquiry" syntax tree is formed, and "menu-A" and "menu-B" syntax trees are linked, as child syntax trees, with each other.

Subsequently, the "menu-A" skeleton having a skeleton type defined as "oneOf (single selection)" is set as an object to be processed. In this case, since the "menu-A" skeleton has no evaluable expression (where syntax), a menu of a single selection type having all menu display texts (x, y, and z) as candidates is formed and displayed.

When the display text y is selected by the user, the menu inquiry control means 17 calls the tree structure data constructing means 15 to cause it to update the tree structure data 14. In this case, an "item-y" syntax tree is linked as a child syntax tree of the "menu-A" syntax tree.

Since the skeleton type of the linked "item-y" skeleton is "empty", the skeleton data 12 is retraced to set the "menu-B" skeleton as the next object to be processed. In this case, since the "menu-B" skeleton has an evaluable expression, "Y" is determined in step ST11. In step ST12, the menu inquiry control means 17 calls the menu candidate evaluating means 16 to cause it to specify limited menu display items.

More specifically, the menu candidate evaluating means 16 evaluates the evaluable expression on the "menu-B" skeleton by referring to the tree structure data 14 constructed up to the present. In this case, the evaluable expression is set such that menu candidates are changed depending on whether the child syntax tree of "menu-A" is "item-x", "item-y", or "item-z". In this case, since "item-y" is the child syntax tree, the texts p and q are determined as candidates (step ST13).

When the two candidates (p and q) are determined in this manner, the menu inquiry control means 17 forms and displays a menu of a single selection type menu having the menu display texts p and q as candidates in step ST14. If only one candidate is selected, the flow advances to the next step without forming/displaying a menu, assuming that this candidate is selected by the user.

If, for example, the display text p is selected by the user in step ST15, the menu inquiry control means 17 calls the tree structure data constructing means 15 to cause it to update the tree structure data 14 in step ST16. Note that in this case, an "item-p" syntax tree is linked as a child syntax tree of the "menu-B" syntax tree.

Since the skeleton type of the linked "item-p" skeleton is "empty", a search for the next object to be processed is performed by retracing the skeleton data 12. However, since no object to be processed is present, the processing is terminated.

In this manner, an inquiry context is described as a rule by using evaluable expressions and the like, and tree structure data is constructed by retracing skeleton data based on this rule description, thereby determining candidates to be displayed on a menu.

Since menu display items can be determined by an evaluable expression, the number of menu choices can be minimized, and an inquiry itself can be omitted, depending on an evaluation result, to allow next menu display. Therefore, menu inquiry processing which is easy for the user to handle can be realized.

In addition, this present invention requires no special programs corresponding to the contents of inquiries. For this reason, the present invention can be used in menu inquiry processing in various systems with a small-sized program. Therefore, the present invention can be widely used for various systems.

Furthermore, when an inquiry content or a context is changed after a system is constructed, the program itself need not be changed, but only the data of the corresponding rule description needs to be changed. Therefore, an improvement in maintenance can be achieved.

FIG. 5 shows another embodiment of the present invention, specifically a system to which a system for editing structure data by hierarchical menu inquiry processing is applied.

Referring to FIG. 5, this system comprises a rule describing section 21, a skeleton data generating means 22, an inquiry means 24, and a structure data constructing means 26. The rule describing section 21 serves to store a rule description defining the form of an inquiry, a context, and the like. The skeleton data generating means 22 generates each inquiry from the rule description in the rule describing section 21 as skeleton data 23 expressed in the form of a tree structure. The inquiry means 24 constructs syntax tree data 25 expressed in the form of a tree structure, which is formed from results selected by displaying inquiries while referring to and evaluating the skeleton data 23 and syntax tree data (to be described later) constructed up to the present. The structure data constructing means 26 constructs structure data 27 by referring to the skeleton data 23 and the syntax tree data 25.

The functions of the respective means constituting the system shown in FIG. 5 will be described next.

The function of the rule describing section 21 will be described first. A plurality of skeletons are defined as a rule description in the rule describing section 21. In this case, each skeleton is defined as follows:

skeleton name=skeleton type parameter
    resource name resource value
    resource name resource value The skeletons are classified into the following types (1) to (8) in accordance with the forms of inquiries. The respective skeletons have different parameters and resource names. Various inquiry forms can be realized by combining these parameters and resource names.

(1) field type skeleton

A field type skeleton is a skeleton which is used to make an inquiry to input a character string, has no parameter, and is located at a leaf of a tree structure.

(2) oneOf type skeleton

A oneOf type skeleton is a skeleton which has a fixed number of child skeletons, as parameters, which can be candidates, causes the user to select one of the child skeletons, and is used to make an inquiry about the selected child skeleton.

(3) oneOfList type skeleton

A oneOfList type skeleton is a skeleton which is used to make an inquiry upon designating the elements of an already constructed list (List) as selection elements by a parameter, and causes the user to select one of the elements.

(4) oneOfMap type skeleton

A oneOfMap type skeleton is a skeleton which has a fixed number of skeletons, as parameters, which can be candidates, and is used to make an inquiry about a child skeleton selected from two-dimensional candidates.

(5) struct type skeleton

A struct type skeleton is a skeleton which has a fixed number of skeletons as parameters, and is used to sequentially make inquiries about the child skeletons.

(6) randomStruct type skeleton

A randomStruct type skeleton is a skeleton which has a fixed number of child skeletons as parameters, and is used to make an inquiry about a child skeleton selected by an inquiry.

(7) list type skeleton

A list type skeleton is a skeleton which can have a fixed number of child skeletons as elements which are indicated by parameters, and provides editing functions such as add, change, delete, cut, copy, and paste processing of elements in an editing operation.

(8) quote type skeleton

A quote type skeleton is a skeleton which does not make an inquiry, is located at a leaf of a tree structure, and defines the value of a constant.

The following typical resources (1) to (6) which the respective skeletons can have will be described next. The types of resources which the respective skeletons can have differ from each other because of the characteristics of the resources.

(1) format resource

A format resource is a resource for defining a conversion format for conversion to structure data. All the types of skeletons can have this resource.

(2) message resource

A message resource is a resource that a skeleton making an inquiry can have, and defines a text to be displayed together with inquiry items.

(3) maxChars resource

A maxChars resource is a special resource for the field skeleton, which defines the maximum number of characters which can be input.

(4) menuItem resource

A menuItem resource is a resource for defining a display text as a selection item. The oneOf, oneOfList, oneOfMap, and randomStruct skeletons can have this resource.

(5) where resource

A where resource is a resource for designating a candidate condition for selection items by an expression. The oneOf, oneOfList, and oneOfMap skeletons can have this resource.

(6) check resource

A check resource is a resource for designating the consistency of constructed syntax tree data. All the types of skeletons can have this resource.

The skeleton data generating means 22 and the skeleton data 23 generated by the skeleton data generating means 22 will be described next.

The skeleton data 23 is static data having the form of a tree structure as the internal form of the system of the rule description, and is constructed by the skeleton data generating means 22 when the system is started. Each element of the skeleton data 23 has a procedure pointer for the inquiry means 24 and a pointer for resource. If the skeleton data 23 has a child skeleton, each element also has a pointer for the child skeleton.

The inquiry means 24 and the syntax tree data 25 will be described next.

The inquiry means 24 is arranged for each skeleton type, and proceeds with an inquiry while vertically retracing the current skeleton data 23. As a result, the inquiry means 24 proceeds with construction while performing addition and deletion with respect to the syntax tree data 25. Inquiry processing is not necessarily performed with respect to all the skeleton types. An inquiry may not be made with respect to some skeleton types.

In addition, the inquiry means 24 is not arranged for each inquiry but is arranged for each skeleton type, and can be commonly used for the same skeleton type.

The syntax tree data 25 is dynamic data having the form of a tree structure and has a pointer for each parent syntax tree, a pointer for the corresponding skeleton data 23, a pointer of a child syntax tree, and the like.

The structure data constructing means 26 and the structure data 27 will be described next.

The structure data constructing means 26 is arranged for each skeleton type, and constructs the structure data 27 by hierarchically retracing the syntax trees of the syntax tree data 25 from the uppermost syntax tree, and referring to the "format resource" of a skeleton designed by each syntax tree.

The operation of the system of this embodiment will be described below with reference to a simple case of inquiry processing.

FIG. 6 shows inquiry processing. There are three inquiries. First, a text is input by means of a field type menu-a (step ST61). A single item is then selected by means of a oneOf type menu-b (step ST62). Finally, a single item is selected by means of a oneOf type menu-c (steps ST64 and ST65). Assume, in this case, that different selection candidates are set in the menu-c depending on selection performed by means of the menu-b.

FIG. 7 shows a state of a rule description for realizing the inquiry processing. The line numbers shown in FIG. 7 are used for the following description. In this case, the description is made by using four of the above-described skeleton types.

In the inquiry skeleton description on lines 3 to 5 in FIG. 7, that inquiries about menu (menu-a, menu-b, and menu-c) skeletons are sequentially performed is defined by a struct type skeleton.

In the menu-a skeleton description on lines 7 to 10, definition is performed by a field type skeleton.

In the menu-b skeleton description on lines 12 to 17, that one of item-x and item-y skeletons is selected is defined by a oneOf type skeleton.

In the menu-c skeleton description on lines 19 to 34, that one of item-p, item-q, and item-r skeletons is selected is defined by a oneOf type skeleton. In this case, the "where resource" expression on lines 26 to 34 defines that selection candidates are changed in accordance with a selection result obtained with the already selected menu-b skeleton.

Lastly, in each quote skeleton description on lines 36 to 48, each skeleton located at a leaf tree node is defined by a quote type skeleton.

Figure 8:
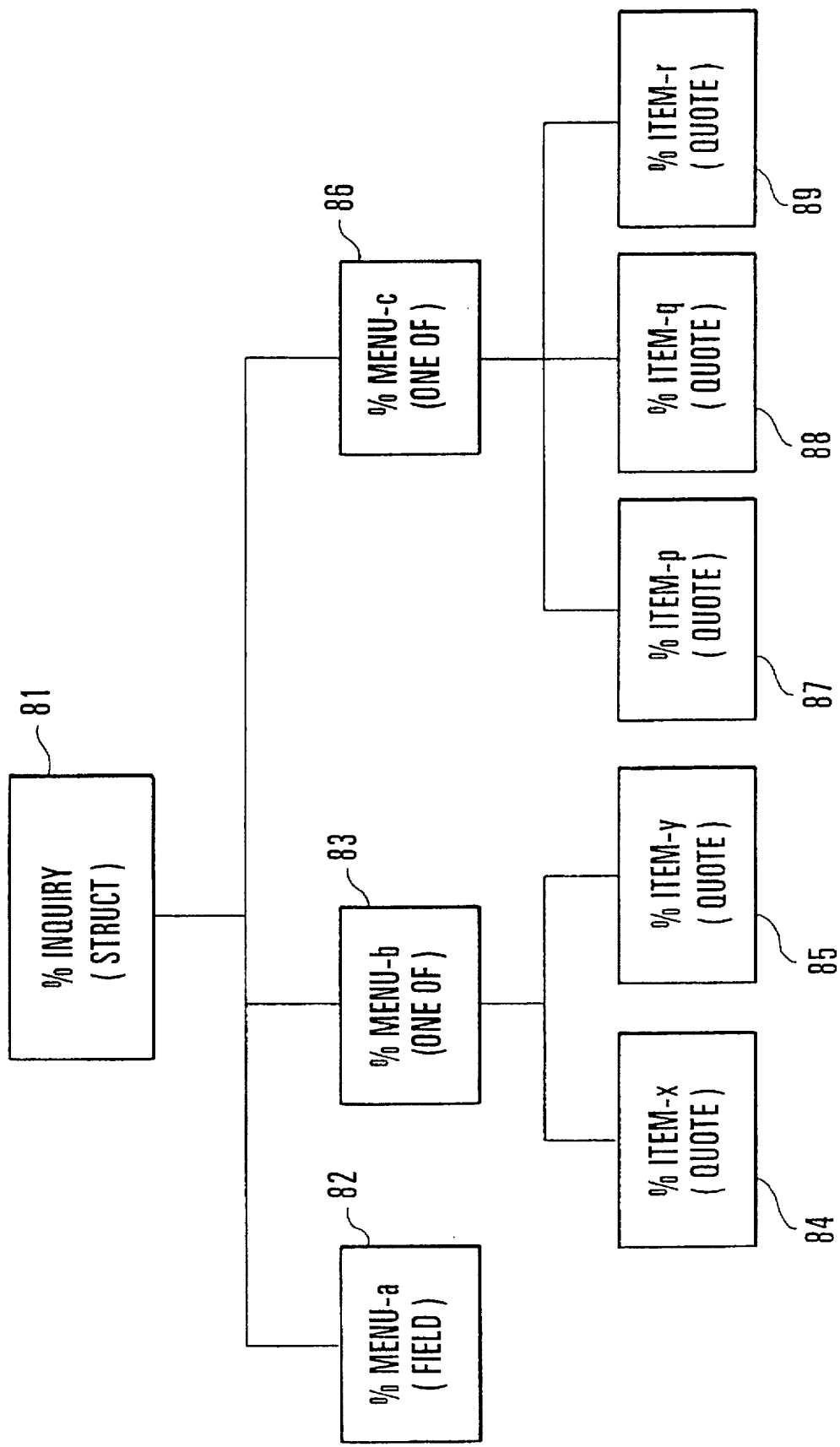
FIG. 8 is a block diagram showing the arrangement of skeleton data formed from a rule description in the second system.

FIG. 8 shows the tree structure of skeleton data constructed by the skeleton data generating means 22 in accordance with the rule description shown in FIG. 7. The skeleton data generating means 22 interprets the skeleton names, the parameters, and the resources in the rule description, and constructs skeleton data having "%inquiry" as root data. The skeleton data shown in FIG. 8 also includes display texts used for inquiry processing, the format of structure data, and the like. Therefore, all the context of inquiries can be expressed by the skeleton data.

Figure 9:
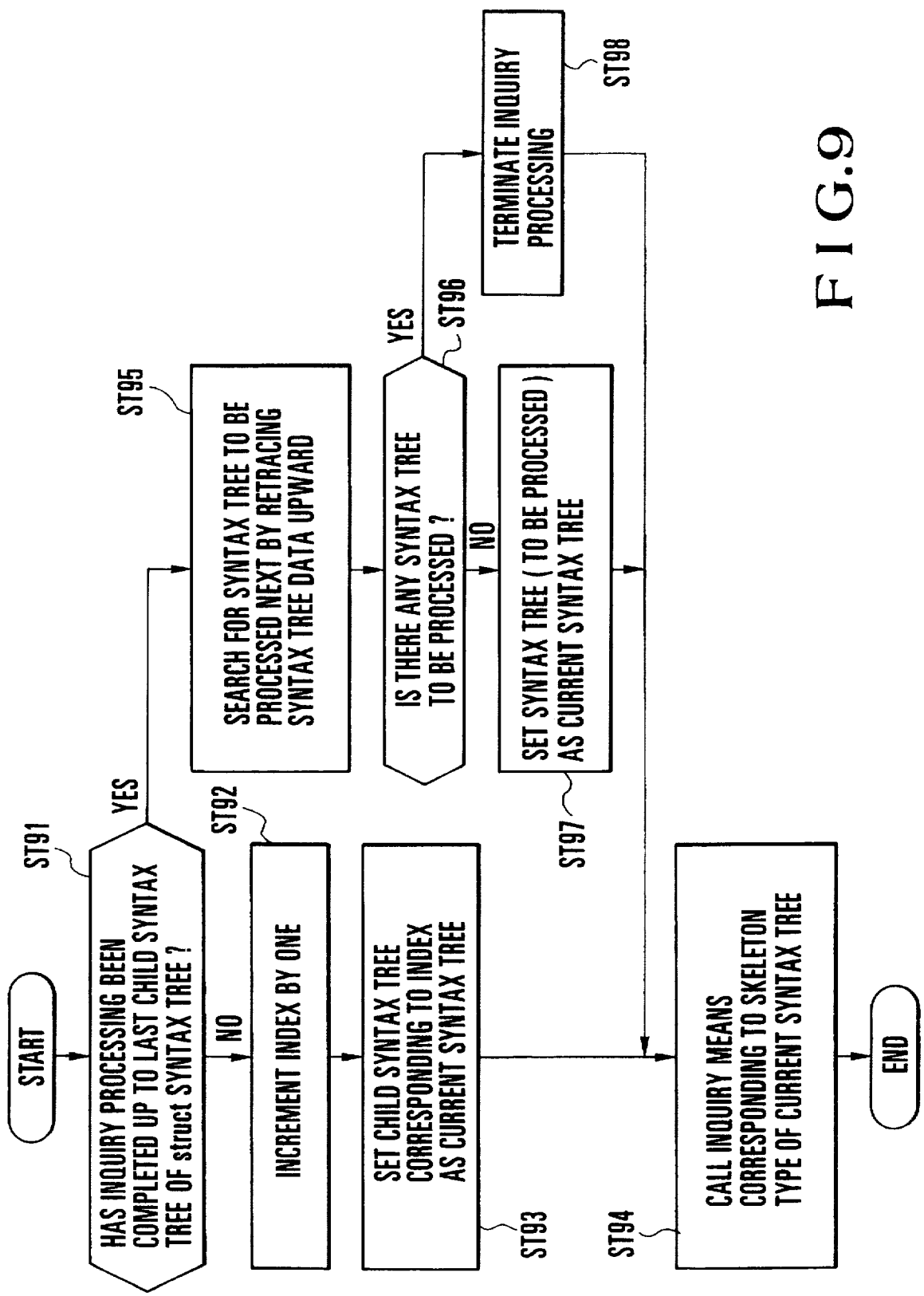
FIG. 9 is a flow chart showing the operation of a struct inquiry means in an inquiry means constituting the second system.
Figure 10:
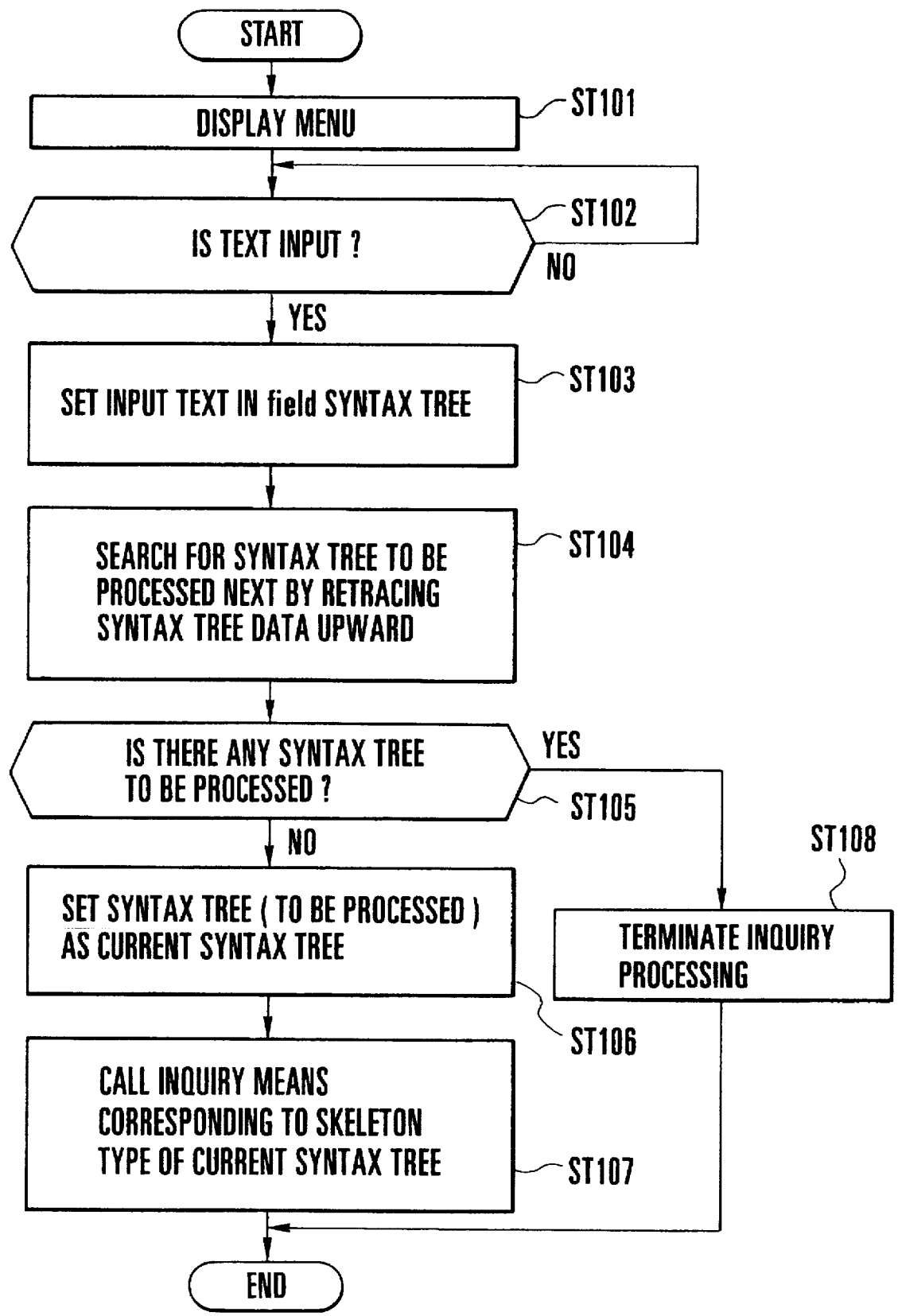
FIG. 10 is a flow chart showing the operation of a field inquiry means in the second system.
Figure 11:
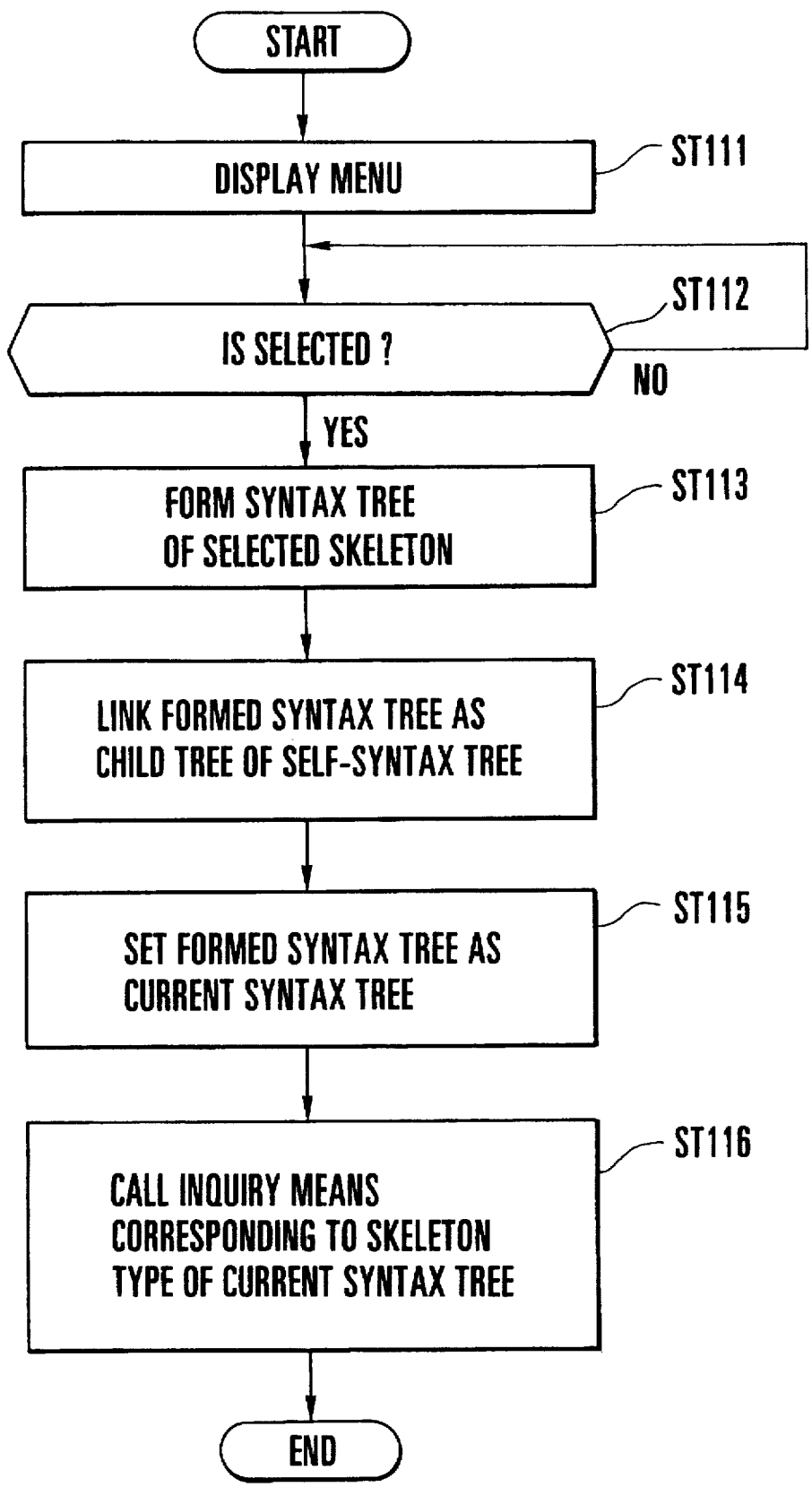
FIG. 11 is a flow chart showing the operation of a so-called "oneOf" inquiry means in the second system.
Figure 12:
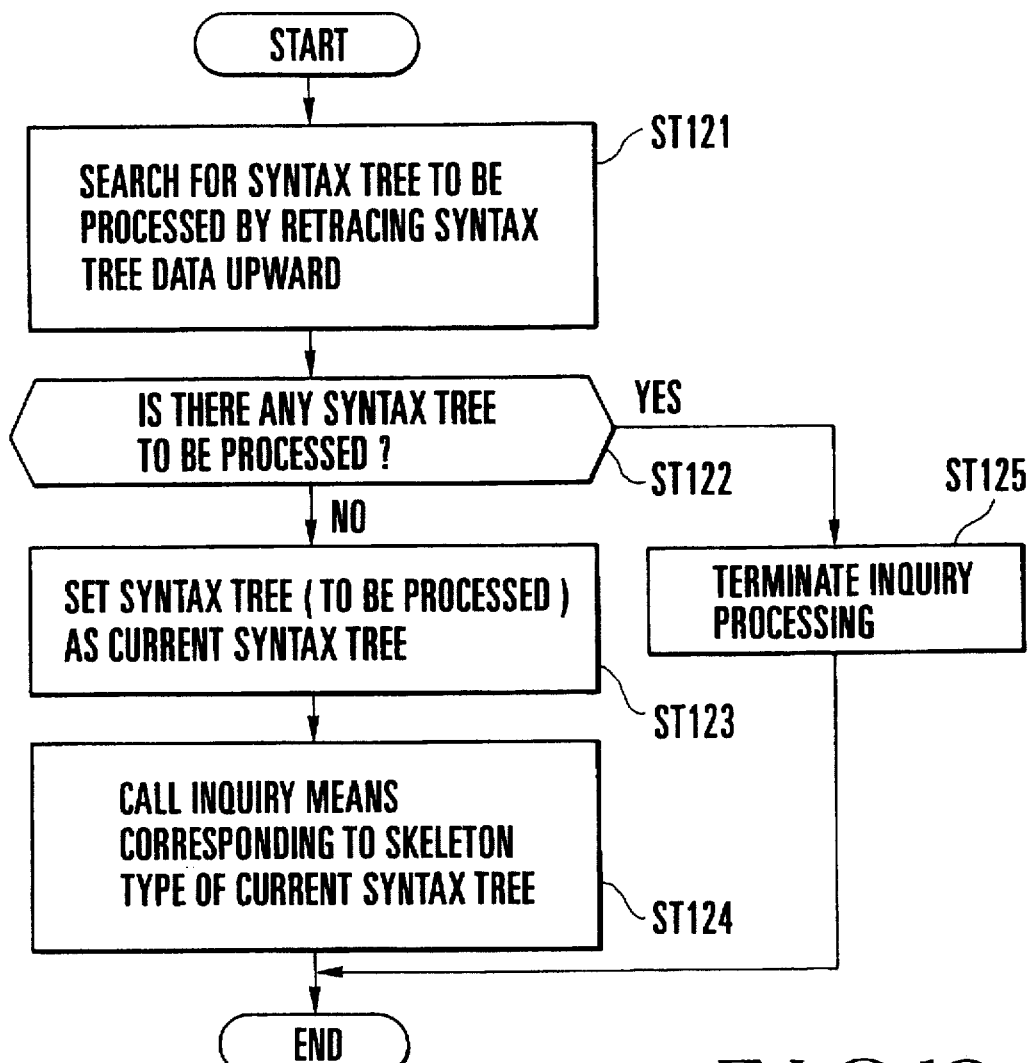
FIG. 12 is a flow chart showing the operation of a quote inquiry means in the second system.
Figure 13:
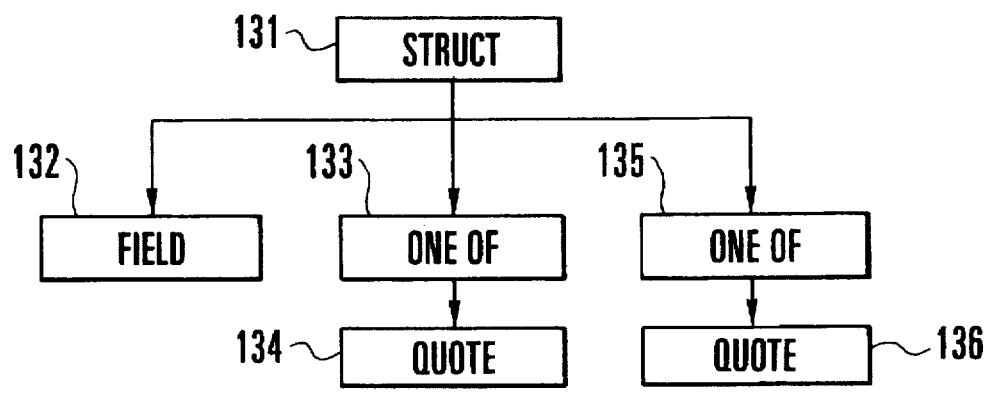
FIG. 13 is a block diagram showing the arrangement of syntax tree data constructed in the second system.

FIG. 9 shows a sequence of operations performed by a struct inquiry means. FIG. 10 shows a sequence of operations performed by a field inquiry means. FIG. 11 shows a sequence of operations performed by a oneOf inquiry means. FIG. 12 shows a sequence of operations performed by a quote inquiry means. FIG. 13 shows the tree structure of syntax tree data.

An inquiry operation in the above-described system will be described below with reference to FIGS. 9 to 13 and FIG. 8 described above.

In the main processing performed by the inquiry means 24, a struct syntax tree for the first inquiry, which is denoted by reference numeral 131 in FIG. 13, is formed. In this case, "0" is initially set as index information which is present in this syntax tree.

At the same time when the struct syntax tree 131 is formed, child syntax trees denoted by reference symbols 132, 133, and 135 in FIG. 13 are formed and linked to the struct syntax tree 131. As will be described later, these syntax trees are formed by inquiry means included in the inquiry means 24 and arranged for the respective skeleton types.

In the main processing performed by the inquiry means 24, a syntax tree to be currently processed, i.e., a current syntax tree, is set as a struct syntax tree, and the struct inquiry means corresponding to the skeleton type of the current syntax tree is called.

The called struct inquiry means checks in step ST91 in FIG. 9 whether inquiry processing has been completed up to the last child syntax tree. In this case, since inquiry processing has not been completed yet, the index is incremented by one in step ST92. In step ST93, a child syntax tree corresponding to the index (the field child syntax tree 132 in FIG. 13 in this case) is set as a current syntax tree. Thereafter, in step ST94, the field inquiry means corresponding to the skeleton type of the current syntax tree is called.

In this case, the field inquiry means displays a menu in step ST101 of FIG. 10. In step ST102, the field inquiry means waits until a text is input. When a text is input, the input text is set as a field syntax tree (the field child syntax tree 132 in FIG. 13) in step ST103. In step ST104, the field inquiry means searches for the next inquiry by vertically retracing the field syntax tree. In this case, since a struct syntax tree (the struct syntax tree 131 in FIG. 13) can be found upon retracting the field syntax tree upward, "N" is obtained in step ST105 in which it is checked whether there is any syntax tree to be processed. Therefore, in step ST106, the struct syntax tree (the struct syntax tree 131 in FIG. 13) is set as a current syntax tree. In step ST107, the struct inquiry means corresponding to the skeleton type of the current syntax tree is called. Note that if there is no syntax tree to be processed, the flow advances to step ST108 to complete the inquiry processing.

In step ST91 of FIG. 9, the called struct inquiry means checks whether inquiry processing has been completed up to the last child syntax tree. In this case, since the inquiry processing has not been completed yet, the index is incremented by one in step ST92, and a child syntax tree corresponding to the index (the oneOf child syntax tree 133 in FIG. 13 in this case) is set as a current syntax tree in step ST93. Thereafter, in step ST94, the oneOf inquiry means is called as an inquiry means corresponding to the skeleton type of the current syntax tree.

In step ST111 of FIG. 11, the oneOf inquiry means displays a menu having "%item-x" and "%item-y", respectively denoted by reference numerals 84 and 85 in FIG. 8, as selection candidates. In step ST112, the oneOf inquiry means waits until an item is selected. When an item is selected, and it is determined that the selected item is the second item, a quote syntax tree (a quote child syntax tree 134 in FIG. 13) corresponding to an "item-y" skeleton denoted by reference numeral 45 in FIG. 8 is formed in step ST113. In step ST114, the formed syntax tree is linked as a child syntax tree of the oneOf syntax tree (the oneOf child syntax tree 133 in FIG. 13). In step ST115, the child syntax tree (the quote child syntax tree 134 in FIG. 13) is set as a current syntax tree. In step ST116, the quote inquiry means corresponding to the skeleton type of the current syntax tree is called.

In this case, the called quote inquiry means performs no inquiry processing. Since this quote inquiry means located at a leaf of the tree structure, a search for the next inquiry is made by retracing the syntax tree data upward in step ST121 of FIG. 12. In this case, when the syntax tree data is retraced upward, the struct syntax tree (the struct syntax tree 131 in FIG. 13) is found, "N" is obtained in step ST122 in which it is checked whether there is any syntax tree to be processed. Therefore, in step ST123, this struct syntax tree is set as a current syntax tree. In step ST124, the struct inquiry means corresponding to the skeleton type of the current syntax tree is called. Note that if there is no syntax tree to be processed, the flow advances to step ST125 to terminate the inquiry processing.

In step ST91 of FIG. 9, the struct inquiry means checks whether inquiry processing has been completed up to the last child syntax tree. In this case, since the inquiry processing has not been completed yet, the index is incremented by one in step ST92, and the child syntax tree 135 in FIG. 13 is set as a current syntax tree. Thereafter, in step ST94, the oneOf inquiry means corresponding to the skeleton type of the current syntax tree is called.

In step ST111 of FIG. 11, the oneOf inquiry means displays a menu. In step ST112, the oneOf inquiry means waits until an item is selected. In this case, since a oneOf skeleton (denoted by reference numeral 86 in FIG. 8), to which retracing can be performed from the oneOf syntax tree (the child syntax tree 135 in FIG. 13), includes "where resource", the candidates are specified to "%item-p" and "%item-q" respectively denoted by reference numerals 87 and 88 in FIG. 8. If the item selected here is the first item, a quote syntax tree (a syntax tree 136 in FIG. 13) corresponding to the "item-p" skeleton (denoted by reference numeral 87 in FIG. 8) is formed in step ST113. In step ST114, the quote syntax tree is linked as a child syntax tree of the oneOf syntax tree (the syntax tree 135 in FIG. 13). In step ST115, the child syntax tree (the syntax tree 136 in FIG. 13) is set as a current syntax tree. Thereafter, in step ST116, the quote inquiry means corresponding to the skeleton type of the current syntax tree is called.

Although the quote inquiry means performs no inquiry processing, the means searches for the next inquiry by retracing the syntax tree data upward in step ST121 of FIG. 12. In this case, since the struct syntax tree (the syntax tree 131 in FIG. 13) is found by retracing the syntax tree data upward, "N" is obtained in step ST122 in which it is checked whether there is any syntax tree to be processed. Therefore, in step ST123, the struct syntax tree (the syntax tree 131 in FIG. 13) is set as a current syntax tree. In step ST124, the struct inquiry means corresponding to the skeleton type of the current syntax tree is called.

In step ST91 of FIG. 9, the struct inquiry means checks whether the inquiry processing has been completed up to the last child syntax tree. In this case, since the index is "3", the inquiry processing with respect to all the syntax trees has been completed. Therefore, in step ST95, a search for the next inquiry is made by retracing the syntax tree data upward. It is, however, determined in step ST96 that there is no other inquiry, because the self-syntax tree is the root. In step ST98, the inquiry processing is terminated. Note that if it is determined in step ST96 that there is another inquiry, the processing in step ST94 is executed after setting the syntax tree (to be processed) as a current syntax tree in step ST97.

In this manner, syntax tree data reflecting the inquiry results obtained by the inquiry means 24 is constructed, as shown in FIG. 13. The structure data constructing means 26 then obtains the following structure data, as target data, in accordance with the format in the resource of the skeleton indicated by each syntax tree data.

answer(abcdef, yyy, ppp)

In this case, "answer" is "format resource" of "%inquiry", "abcdef" is a text input through "%menu-a", "yyy" is "format resource" of "%item-y" selected through "%menu-b", and "ppp" is "format resource" of "%item-p" selected through "%menu-c".

As described above, the present invention is constituted by the versatile components, i.e., the skeleton data generating means 22, the skeleton data 23, the syntax tree data 25, and the structure data constructing means 26. Therefore, by only defining a rule description in accordance with the context of hierarchical inquiries, the present invention can be flexibly used for a system designed to obtain structure data as the result to hierarchical inquiry processing.

In addition, since the context of inquiries is held not in the inquiry means but in the rule description, a structure data editing system with excellent maintainability can be realized.

As has been described above, according to the present invention, when menu inquiry processing is to be performed, since tree structure data constructed by the tree structure data constructing means includes the context of past inquiries, the menu candidate evaluating means omits unnecessary choices from the context of the past inquiries while retracing the tree structure data, thereby determining candidates to be displayed on the menu. With this operation, minimum necessary menu display can be realized by a small-sized program. Therefore, optimal menu inquiry processing with excellent operability and excellent maintainability can be performed.

In addition, skeleton data as a framework of inquiries is formed from a rule description defining the context of inquiries, and syntax tree data is constructed by performing inquiry processing while referring to the formed skeleton data and syntax tree data indicating inquiry results. Furthermore, structure data is obtained from the constructed syntax tree data. Therefore, by only defining a rule description in accordance with the context of hierarchical inquiries, the present invention can be flexibly used for a system designed to obtain structure data as the result to hierarchical inquiry processing. Moreover, since the context of inquiries is included in a rule description, a system with excellent maintainability can be realized.

What is claimed is:

1. An optimal menu inquiry system for displaying inquiries with a hierarchical structure as menu items comprising:

skeleton data generating means for generating inquiries from a rule description describing a context of a plurality of inquiries as skeleton data by sequentially linking the plurality of inquiries, from a first inquiry to at least one subsequent inquiry in a form of a tree structure;

tree structure data constructing means for constructing and changing tree structure data by sequentially retracing the skeleton data from the first inquiry, the skeleton data being sequentially generated by said skeleton data generating means in correspondence with each of the inquiries from the first inquiry to the at least one subsequent inquiry;

menu display means for displaying a plurality of menu items corresponding to constructed/changed tree structure data;

control means for controlling said tree structure data constructing means to change the tree structure data when one of the menu items displayed by said menu display means is selected by a user; and menu candidate determining means, when the skeleton data includes an evaluable expression, for evaluating the evaluable expression in the skeleton data using the constructed/changed tree structure data, and determining at least one of the menu items to be displayed by said menu display means.

2. A system for editing structure data by hierarchical menu inquiry processing, comprising:

skeleton data generating means for generating inquiries from a rule description describing a context of a plurality of the inquiries as skeleton data serving as a skeleton of the inquiries by sequentially and hierarchically linking the plurality of inquiries from a first inquiry to at least one subsequent inquiry in a form of a tree structure;

inquiry control means for performing inquiry processing while referring to and evaluating the skeleton data and a syntax tree data indicating results of the inquiries, and constructing the syntax tree data; and structure data constructing means for constructing structure data on a basis of the skeleton data designated by the syntax tree data constructed by said inquiry control means.

3. A system according to claim 2, wherein the skeleton data is of a plurality of types corresponding to forms of inquiries, and said inquiry control means is constituted by a plurality of inquiry type control means corresponding to the respective plurality of types of skeleton data.

4. A system according to claim 3, wherein each inquiry type control means is started by another of said inquiry type control means, and said started inquiry type control means constructs syntax tree data by performing inquiry processing while retracing the skeleton data and the syntax tree data, which has undergone inquiry processing, toward a root data, and starting inquiry control means corresponding to a type of skeleton data corresponding to the constructed syntax tree data after the syntax tree data is constructed.

5. A system according to claim 3, wherein each inquiry type control means is started by another of said inquiry type control means, and said started inquiry type control means constructs syntax tree data by performing inquiry processing while retracing the skeleton data and the syntax tree data, which has undergone inquiry processing, toward a node data, and starting inquiry control means corresponding to a type of skeleton data corresponding to the constructed syntax tree data after the syntax tree data is constructed.

* * * * *